United States Patent [19]

Sengua

[11] 4,272,136

[45] Jun. 9, 1981

[54] WORK STATION

[76] Inventor: Saturnino Sengua, 5850 E. Burns, Tucson, Ariz. 85711

[21] Appl. No.: 42,801

[22] Filed: May 29, 1979

[51] Int. Cl.$^3$ ...................... A47B 96/18; F16M 11/24

[52] U.S. Cl. ................................... 312/196; 312/223; 312/224; 248/188.4; 248/206 A

[58] Field of Search ............... 312/196, 197, 223, 224, 312/225, 203; 248/188.4, 188.8, 206 A

[56] References Cited

U.S. PATENT DOCUMENTS

| | | | |
|---|---|---|---|
| 236,179 | 1/1881 | Robbins | 312/196 |
| 798,634 | 9/1905 | Stevens | 312/196 |
| 821,167 | 5/1906 | Hurt et al. | 312/224 |
| 1,978,819 | 10/1934 | Roller | 312/223 |
| 2,089,999 | 8/1937 | Greene | 312/223 |
| 2,306,209 | 12/1942 | Elofson et al. | 312/223 |
| 2,327,050 | 8/1943 | Kotler | 248/188.4 |
| 2,580,099 | 12/1951 | Jaeger | 248/206 A |
| 2,636,416 | 4/1953 | Platt | 248/188.4 |
| 2,654,056 | 9/1953 | Milander et al. | 312/223 |
| 2,678,489 | 5/1954 | Ratzlaff et al. | 312/196 |
| 2,755,156 | 7/1956 | Nichols | 312/223 |
| 2,860,404 | 11/1958 | Alden | 312/223 |
| 3,045,389 | 7/1962 | Arnit | 248/188.4 |
| 3,142,521 | 7/1964 | Petroff | 312/196 |
| 3,204,776 | 9/1965 | Brown et al. | 248/206 A |
| 3,862,785 | 1/1975 | Scheerhorn et al. | 312/223 |
| 3,920,299 | 11/1975 | Propst et al. | 312/223 |
| 4,053,193 | 10/1977 | Grover et al. | 312/223 |

*Primary Examiner*—Victor N. Sakran

*Attorney, Agent, or Firm*—J. Michael McClanahan

[57] ABSTRACT

A work station adapted for use by a highly trained technician for repair and testing of complicated machinery and electronic devices such as typewriters and cash registers, the work station having features to facilitate repairs and tests at increased efficiency comprising specially covered table top, a centrally located braked turning table mounted to the table top, a backboard connecting with the table top and adapted to hold tools in a readily accessible position, an elongated mirror situated against the backboard in order that operations of the machinery under test and repair may be observed, specially located pins upon the table top to receive and hold hand tools in a readily accessible position, overhead lights operably attached to the work table top and back to provide near sunlight for the technician, electrical outlets provided in convenient positions in the front and the back of the work station, at least one of the electrical outlets having its output voltage controllable.

6 Claims, 8 Drawing Figures

WORK STATION

BACKGROUND OF THE INVENTION

Work stations or work benches for technicians working in the electronics labs and/or upon complicated machinery are known, however, these work benches and work stations are not constructed to provide the features and location of features necessary to enchance the technician's efficiency, and as a consequence, the work output of the technician is severely reduced over what it could be. There have been work tables or benches for different types of specialized equipment, but none for the technician that labors in the work area for which the Applicant's work station is designed.

For example, work tables have been known which provide a series of electrical outlets convenient to the work table top and additionally, provide storage under the work table top, such as U.S. Pat. No. 2,654,056, where a plurality of switched electrical outlets are provided convenient to a table top.

In addition, cabinet structures for dental equipment have been devised such as shown in U.S. Pat. No. 4,053,193 for the location of sinks, x-ray units, lights and cabinet space in a structure accessible from two sides.

Similarly, there have been constructed a plurality of collapsible multi-purpose desks and cabinet units which fold to a minimum size for portability such as shown in the U.S. Pat. No. 2,755,156 and No. 2,089,999.

Finally, secretarial work stations have been devised where equipment convenient for a secretary such as top to receive a typewriter and with telephone located nearby such as shown in U.S. Pat. No. 3,862,785.

However, there exists a need for a specialized work station adaptable to a highly trained technician for work upon complicated machinery and electronics which provides the necessary means by which the equipment operating or under test may be observed simultaneously from all angles as well as other features such as providing locations of tools to enhance efficiency.

SUMMARY OF THE INVENTION

The present invention defines a compact, fully equipped work station for a highly trained technician providing features by which the technician may efficiently and expeditiously repair varied and different intricate machinery such as typewriters, adding machines, calculators, cash registers, accounting machines, air-craft instruments, and the like. Accordingly, the subject invention provides a work station having a table top covered with non-glare, accoustical reducing material of a pleasant, non-fatiguing color; a turning table having a brake attached mounted centrally upon the table top, the turning table adapted to receive the machinery under test in order that the machinery may be rotated at will and, when it is desired that the turning table not rotate, a brake to hold the table stationary; a backboard at the rear of the table top, the backboard adapted to hold fixtures to receive tools and working equipment such as drills; a magnetic strip attached to the backboard to hold in place with high visibility the small precision intricate tools that the technician uses; a mirror attached to the backboard substantially through its total length and approximately one-half the height of the backboard, the mirror providing visual sighting of the rear of the machinery under test or repair; and a clock mounted in easily observable central position at the top of the backboard where the technician may time operations of the machinery by the clock's second hand. In addition, the backboard is painted in a wrinkle finish with color such as to enhance the energy and good feeling of the technician with the wrinkle finish serving to reduce and eliminate light glare.

On opposite ends of the table top and attached thereto are the side boards to reduce distractions from the side and to define the borders of the table top such that tools and equipment do not fall off. Additionally, these sides are painted a fatigue reducing color.

Centrally located above the table top is an overhead light fixture attached to the table by L-shaped supports, the overhead light fixture adapted to have near sunlight light emitting features.

Immediately underneath the table top in the front of the work station and at the rear are provided a plurality of electrical outlets for supplying electrical power to the machinery under test or repair and to electrical tools that might be utilized, at least one of said outlets being controlled by a dimming mechanism whereby the output voltage may be reduced in order to decrease the operating speed of the machinery under test for observation, the electrical power to the electrical outlets being provided by an electrical receptacle adapted to receive primary power.

On the very top of the table top are a plurality of strategically placed pins rising from the table top and so situated to receive the most often used technician's tools which are adapted to laying on a side, such as a needlenose pliers or the like, and which provide for ready access by the technician.

Directly below the table top are a plurality of drawers which are easily accessible to the technician and which provide storage for small parts and lesser used tools. Directly beneath the drawers and the table top is the lighted, partially enclosed, storage area with shelf providing storage facilities for lesser used large tools and equipment, as well as bulky parts.

Each of the four legs supporting the work station is independently adjustable in order that the work station is stable and the height is correctly adjusted for the sitting or standing technician. At the termination of each leg are non-skid molded rubber feet which contribute to the table's stability.

Accordingly, it is an object of the present invention to provide an all encompassing work bench for the highly trained technician whereby all the tools that the technician needs are easily accessible thereby eliminating needless movement and increasing productivity.

Another object of the present invention is to provide lighting which enhances the visibility of intricate and small parts of machinery as well as providing means to observe the machine in test from all angles.

A further object of the present invention is to provide a means by which a machine under repair and test may be rapidly re-oriented by the technician in order that different parts may be reached with a minimum of time and effort.

A still further object of the present invention is to provide the technician with an organized, noise and glare-free environment allowing him to work with comfort and ease.

A still further object of the present invention is to devise a work station whereby the height of the work area may be adjusted conveniently for the technician and that a plurality of electrical outlets for tools and equipment as well as the machine under test are provided.

Other objects and advantages of the invention will become better understood hereinafter from a consideration of the Specification with reference to the accompanying drawings forming a part thereof.

DETAILED DESCRIPTION OF THE PREFERRED EMBODIMENT

Figure 1:
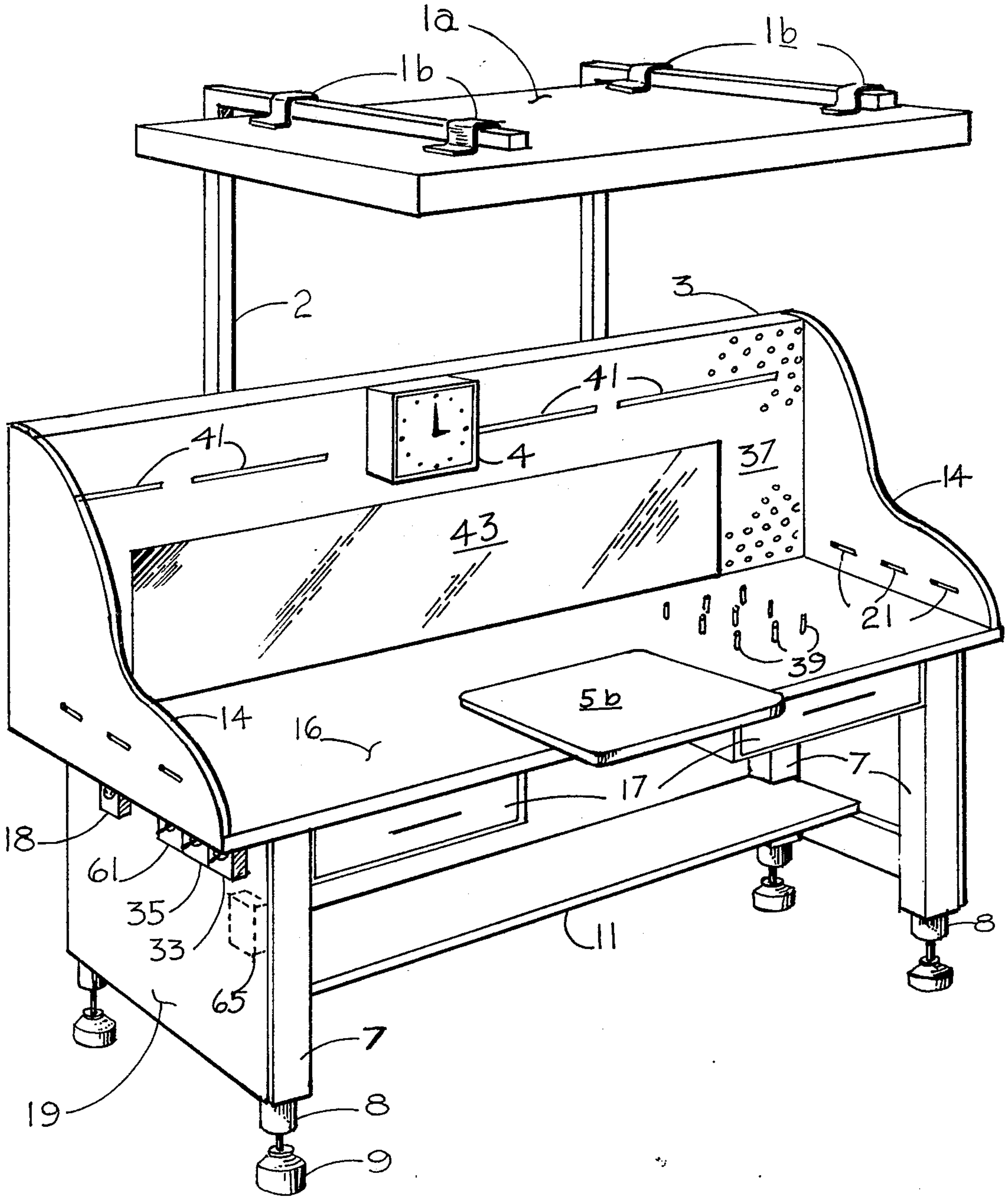
FIG. 1 is a perspective view of the inventive work station.

Referring now to the detailed drawings, a perspective view of the inventive work station is shown in FIG. 1. Of immediate prominence is the work station table type top 16 which, in the preferred embodiment, is constructed of ¾ inch plywood resting upon an angle iron frame (not shown), the top 16 held to the frame by flat headed machine screws which penetrate the top to engage the angle iron frame through holes drilled therethrough whereupon the screws are terminated with threaded nuts. The angle iron frame, is rectangularly shaped and conforms generally to the perimeter of the top 16 except on the front and two ends, the frame is recessed in order to allow some measure of overhang by the top 16. The frame is joined at its corners by welding and serves to strengthen the top for carrying of the work station and to inhibit any tendency of the work station and top to vibrate. Although not shown, the leg assemblies outer leg upper portion hereinafter described is welded to the inner angles of the angle iron frame and thus provides additional strength and stability.

The top 16 is covered with a non-glare material which is attached with an adhesive and strategically placed staples. This material, in the preferred embodiment, is the available type of indoor-outdoor carpeting and is colored blue as it has been determined that blue is a color relaxing to the technician, enhances concentration, reduces eye weariness, and high-lights the shape and identity of light colored metal tools which become easy to locate upon the colored material.

In addition, the material top serves to reduce noises as an accoustical absorbent material and thus provides relief from the noises which are, to a large extent, generated by the machinery under test or repair.

In construction, the top 16 is adapted to extend over the metal frame and towards the technician approximately two inches. Directly underneath the front top extension and attached to the metal frames are the electrical outlets (FIG. 2) which receive the electrical plugs for supplying electrical power to the machine under test and to the electrical tools that the technician is using. Thus the top extension does serve to protect the technician from the immediate presence of the electrical outlets and, when the electrical outlets are used, from presenting a protrusion which might engage the technician's body as he leans over the top when sitting before the work station.

Centrally located upon the top 16 is a heavy duty turning table 5*b* upon which the equipment under test and repair is placed. Since many items of equipment are rather heavy, such as electrical typewriters and cash registers, and it is desirable to be able to rotate the equipment such as to be able to work on the front or the back, the turning table provides a very useful function. The turning table which is utilized in the preferred embodiment is of commercial design and is provided with a brake (5*c* in FIG. 2) and the rotating top of the turning table is supported by a ball bearing race (5*a* in FIG. 2). Thus, by providing the turning table, the necessity to lift in order to turn the machinery under repair is thereby avoided which contributes to the objective of reducing fatigue and muscle soreness for the technician.

Attached to the work station top 16 is the front backboard 37 and parallel side boards 14. In the front, a pegboard material is utilized, such as masonite, which has nominally 3/16 inch holes spaced on one inch centers. A portion of these holes are shown in FIG. 1. Behind the pegboard is a second solid material backing 3 which accomplishes the purpose of inhibiting sound and light emanating from the rear from penetrating the pegboard to annoy the technician.

The pegboard is painted a wrinkle finish red in the preferred embodiment in order to provide a psychological fatigue-free lift to the technician with the wrinkle finish red paint reducing light glare and/or electrical spark reflections.

In the preferred embodiments, small tools are held to the front pegboard through the use of magnetic bar strips 41. These magnetic bar strips 41 run substantially the width of the pegboard and comprise elongated bar magnets set in holders, the holders being held in place by wood screws which penetrate the pegboard. In addition, reaching about halfway up the height of the front pegboard is the lengthwise mirror 43 which has been found invaluable in connection with the repair of intricate mechanical machinery and other equipment. By the means of mirror 43, the functioning of different elements in a piece of machinery normally out of view of the technician may be observed while simultaneously observing the functioning of related elements in the front in the same piece of machinery. This is especially useful in the repair of electrical type-writers and electrical-mechanical calculators and printers. In addition, the mirror provides a panoramic view of the top of the work station which permits the technician to glance in the mirror to locate a tool that he may seek and thereby eliminate unnecessary neck or wrist motion to visually locate the tool. Still, the mirror provides a means by which the technician can observe behind him to meet customers or answer questions without having to turn around.

The parallel side boards 14 located at each end are constructed in the preferred embodiment of wood, preferably plywood. These are painted a darkish, flat grey to avoid light glare and side reflections which may be harmful to the eyes and distracting to concentration. These side boards 14 are exposed to contact with dirty hands, tools, rags and the like and thus make grey an appropriate color. The side boards 14 are held to top 16 by means of elongated threaded bolts which pass from top 16 upward into accommodating holes drilled in the lower edge of side board 14 to engage nuts 21 which are embedded in partial openings formed in the side board 14. Thus, a clean unobstructed side board surface is presented to the technician sitting in front of the bench which also limits side vision which helps mentally to calculate distance while picking up tools by instinct.

Shown also upon the right hand side of top 16 are a plurality of short ($\frac{1}{4}$ inch to $\frac{1}{2}$ inch) emerging metal pins 39 which are strategically placed to accommodate various types of tools (not shown) lying on table top 16. For example, a needle-nosed pliers is frequently used in machinery repair, and the short metal upright pins 39 are placed such as to fix and hold the needle-nosed pliers at a set, easily accessible place. In this case, the pins would be located such as to be received by the needle-nosed pliers between and at the bottom of the slightly opened jaws, and then one pin on the outside of each of the two handles. In this way, the centrally located jaw pin prevents the tool from going forward, i.e., towards the mirror, and the two outside pins keep the pliers handles from opening any farther, the centrally located jaw pin keeping the handles from closing any farther. By this means, the pliers may be easily grasped and either picked straight up or slid a short distance to the rear and then picked up. The technician then may grasp the pliers very easily from the rear and then remove them from the table top without having to fumble for the tool. Thus, often used tools can be located at extremely accessible places upon the table top and, once the technician has become familiar with their placement, he can reach the proper tool without having to remove his eyes from the equipment under test.

The tools which are intended to be held upright by the magnetic metal strips 41 are generally the small intricate tools such as specialized metal awls, miniaturized open and closed end wrenches, precision screw drivers, and other specially constructed metal, but light of weight, tools.

Centrally located at the top of pegboard 37 is clock 4 which, in addition to telling time, provides a second hand which is very necessary to time various operations of the mechanical equipment.

On either side, on the lower portion of the bench, are the lower side boards 19 which join each of the end two legs 7; each of the lower side boards extending from the underside of top 16 to a point about 4 -5 inches above the floor, which also facilitates cleaning surrounding floor area. Joining to the lower side boards 19 in the back is the lower backboard 31 which connects to the back two legs. All lower side and backboards are made of wood, masonite, or similar material and are held in place by means of sheet metal screws, rivets, or bolts which connect onto angle iron strips which connects legs 7.

Joining the lower backboard 31 and side boards 19 is shelf 11, which runs from side to side and extends out about one-half the distance between the legs. Shelf 11 is held in place by means of screws, bolts or the like penetrating the pieces of angle iron which join all legs, the angle iron forming a three-sided frame which is welded to the legs.

Directly above shelf 11 are drawers 17 which are on either side of the under portion of table top 16 which are opened up from the front by pulling out and may be used for tool storage or whatever may be appropriate for the technician.

Legs 7, four of which are at opposite corners, provide means by which to adjust the height of the inventive work station. The height adjustment is accomplished by means of inner legs 8 which are screw adjustable in and out of the outer portion, leg 7. Attached to the bottom most portion of inner leg 8 are feet 9 which nominally presents an enlarged, non-skid resilient rubber surface to the floor to maintain stability. The leg assembly of legs 7, inner legs 8, and feet 9 are presented in more detail in FIGS. 5–7, infra.

Located at both ends are electrical receptacles 18 and 18*a*, of which 18 is shown in FIG. 1, where electrical power is supplied to the work station electrical outlets, clock, overhead light fixture, and the light fixture (FIG. 2) underneath top 16 which illuminates shelf 11 and lower portions of the work station. Various of these fixtures are controlled through the three switches 33 (choice of inlet electrical receptacle 18 or 18*a*), 35 (lower light fixture), and 61 (overhead light fixture), to the right of electrical receptacle 18. The electrical receptacle 18 is a recessed male plug adapted to accomodate a female connector which in turn is connected to the primary source of electrical power. When not in use, a metal threaded cap covers the recessed male connector.

Situated directly above the top 16 and oriented such to illuminate the top 16 is the overhead light fixture 1*a* which comprises a rectangular box-like container containing nominally four elongated electrical lights of the type that closely approximate the sun and thereby reveal true color of objects, while also are of reduced heat emission. These lights (not shown) are in turn covered by a frosted, but translucent, plastic light diffusing cover. The overhead light fixture 1*a* is held in place by means of brackets 1*b* attached thereto, and through which bracket supports emerging from the back portion of the work station suspend the overhead light fixture 1*a*. The brackets 1*b* surround loosely the supports 2 and thereby provide means by which the light fixture 1*a* may be slid forwards or backwards to accomodate the particular desire of the technician. Electrical connection is made to overhead light fixture 1*a* by preferably running the electrical cable through the interior of tubular support 2 from the work station.

Figure 2:
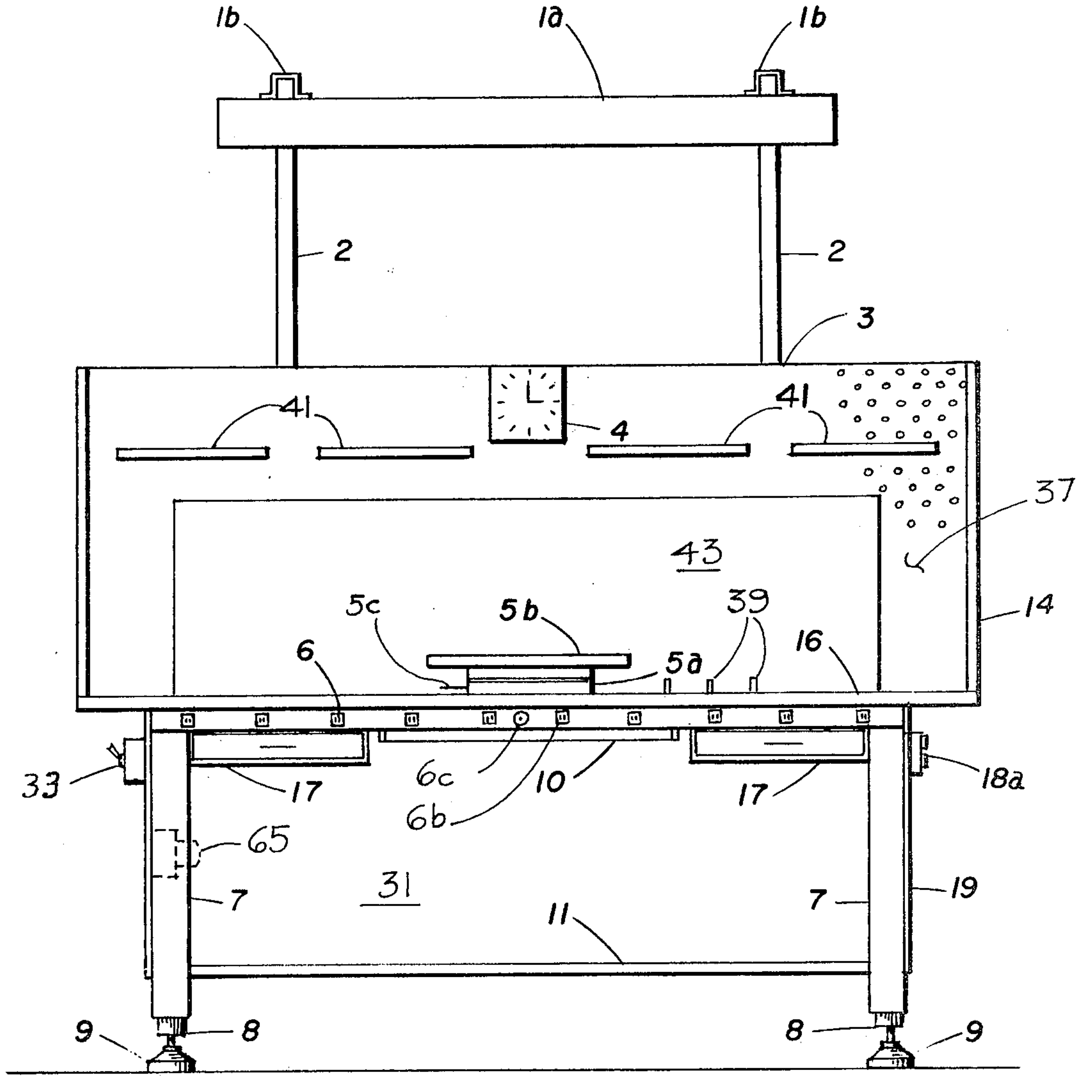
FIG. 2 is a front view of the inventive work station.

Referring now to FIG. 2, a front view of the inventive work bench is shown. Seen plainly are the electrical outlets 6 immediately under the lower surface of top 16, and which receive the electrical plugs for the equipment. Electrical outlet 6*a*, shown at the far left of the strip of electrical outlets 6, is wired to a voltage reducing device, commonly known as a dimmer, in order that the voltage at the outlet 6*a* may be controlled in turns of amplitude. Dimmer control 65 is shown underneath top 16 and on the left hand side wall proximate the work station leg 7. By means of a controllable voltage, equipment under test may be made to operate at a slowed pace in order that individual movements of parts of the machinery may be more easily observed.

Centrally located along the strip which holds electrical outlets 6 is electrical push button 6*c* which connects to electrical outlet 6*b* immediately to the right of the push button. Power is available at electrical outlets 6*b* when push button 6*c* is pushed. This provides for the availability of pulsed electrical power for pulsing the operation of equipment under test to more easily observe the mechanical procedures of the equipment.

Additionally, at either end of the bench are shown the electrical receptacles 18 and 18*a* whereby power may enter the bench from either side, both electrical receptacles 18 and 18*a* connected to electrical switch 33 which in turn supplies power to all the electrical outlets and auxiliary circuits in the work station. The distribution of power is perhaps best illustrated in electrical schematic of FIG. 8 infra.

Light fixture 10 is seen just below top 16, light fixture 10 illuminating the lower portions of the inventive work station. Immediately above light fixture 10 and on the other side of top 16 is shown a front view of the ball-bearinged assembly 5*a* upon which turn table 5*b* rests. To the left of the ball-bearinged assembly 5*a* is brake 5*c* by which operation the turn table is allowed to rotate or to be fixed in one position.

Moving up, clock 4 is shown at the back of peg-board 37. Continuing, as mentioned previously in connection with FIG. 1, the overhead light fixture 1*a* is shown oriented approximately equal distant from each end of the bench and above the work surface, the brackets 1*b* supporting the overhead light fixture with the supports 2. Finally, the drawers on either side immediately below the top 16 are shown, together with outer leg 7, inner leg 8 and feet 9 which comprise the leg assembly. Joining each of the opposite legs is shelf 11.

Figure 3:
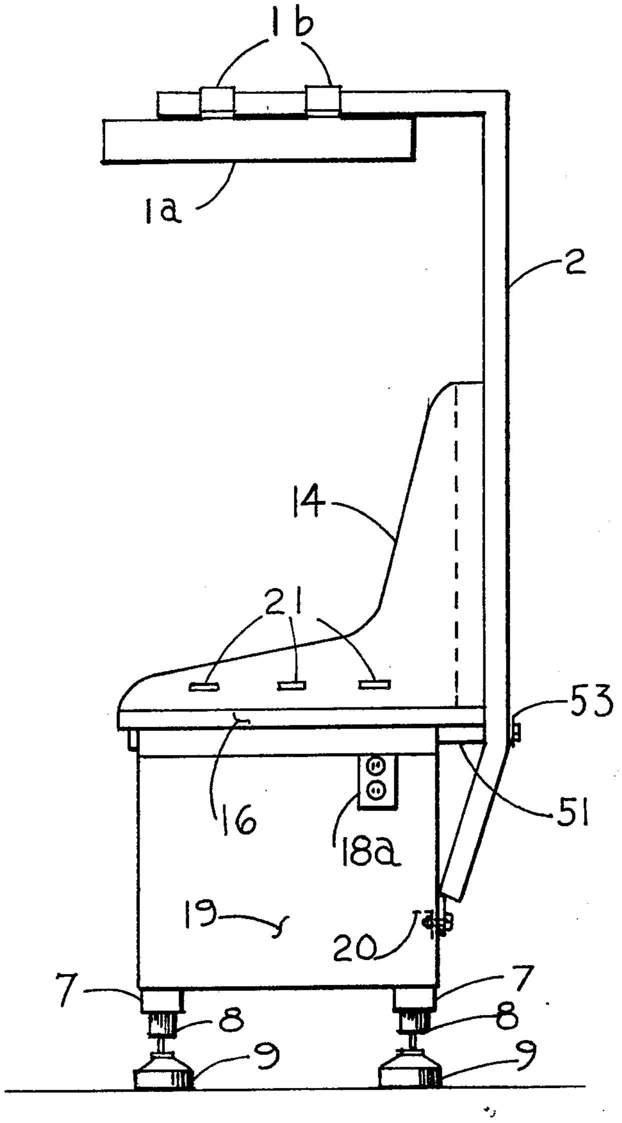
FIG. 3 is a side view of the inventive work station.

Referring now to FIG. 3, an end view of the subject invention is disclosed showing in more particular detail the back supports 2 which suspend the overhead light fixture 1*a*. As can be seen, the supports 2, which in the preferred embodiment are square tubular steel, attach at four places to the inventive work station, to the metal frame 51 upon which the table top 16 rests and to which it is secured, and at the bottom to angle iron 20, which is shown in dotted form, and upon which the shelf 11 in the under side of the work station rests. Shown as an outward protrusion to support 2 is metal machine bolt 53 which fastens support 2 to metal frame 51, and similarly, a machine bolt secures the support 2 at its lower most position. Also shown is an end view of the electrical outlet strip 6 which, as was shown in FIG. 2, has a plurality of electrical outlets located at regular intervals.

Briefly, the remaining elements which comprise the work station have been discussed previously except perhaps, to show that the electrical receptacle 18*a* comprises a pair of recessed metal female plugs.

Figure 4:
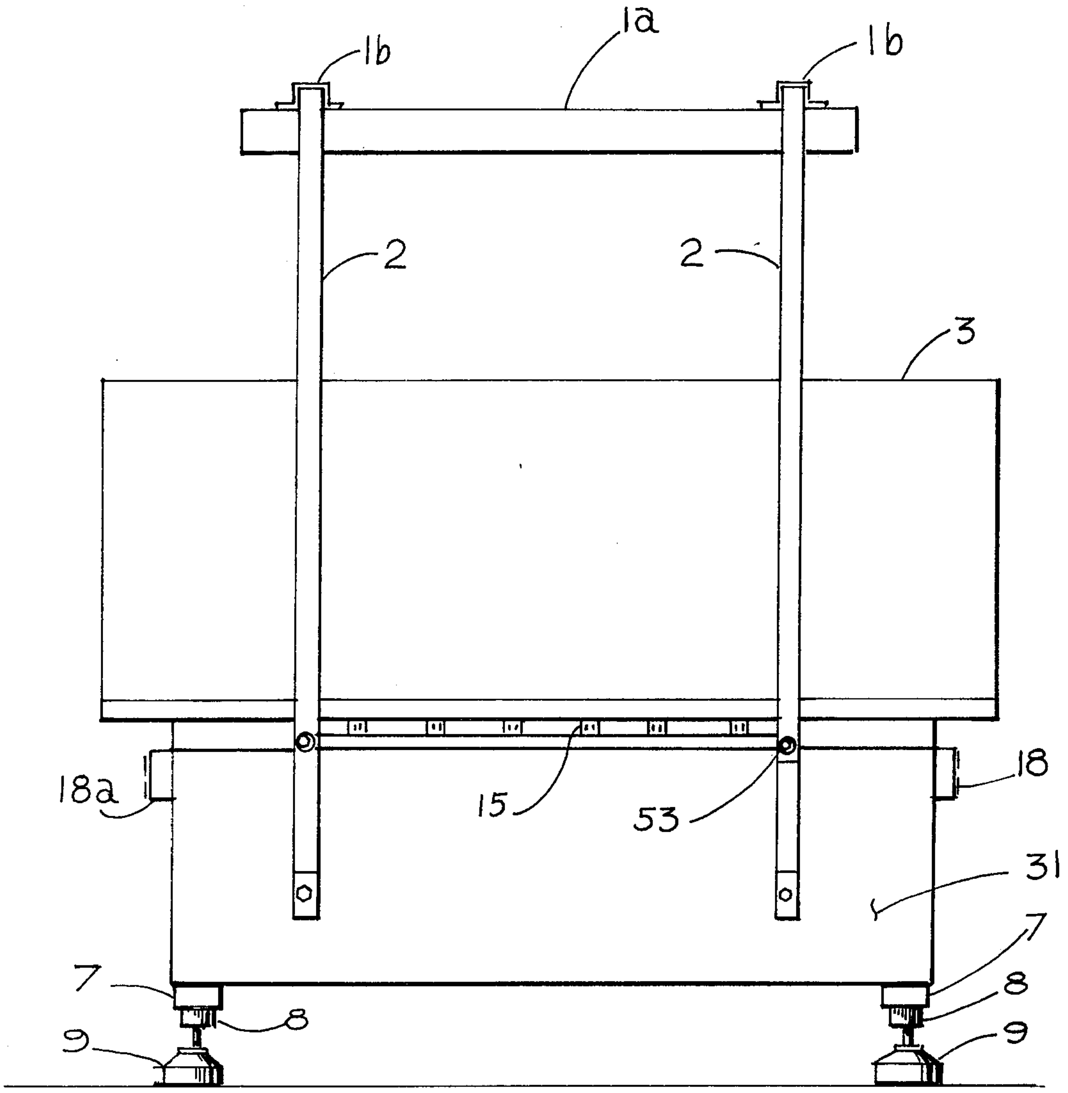
FIG. 4 is a back view of the inventive work station.

Referring now to FIG. 4, a back view of the inventive work station is shown showing the convenient electrical outlet strip 15 which faces to the rear to add even more convenience to the work station. The remaining elements have already previously been described.

Figure 5:
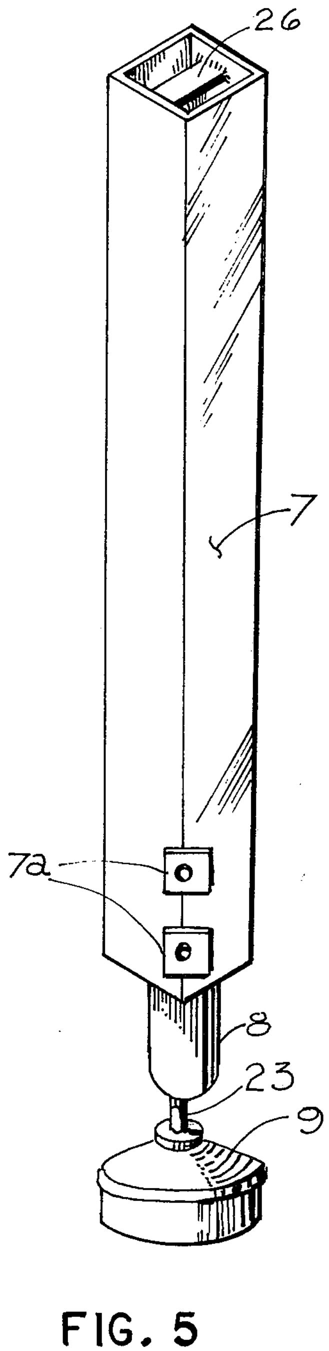
FIG 5 is a perspective view of the leg assembly.
Figure 6:
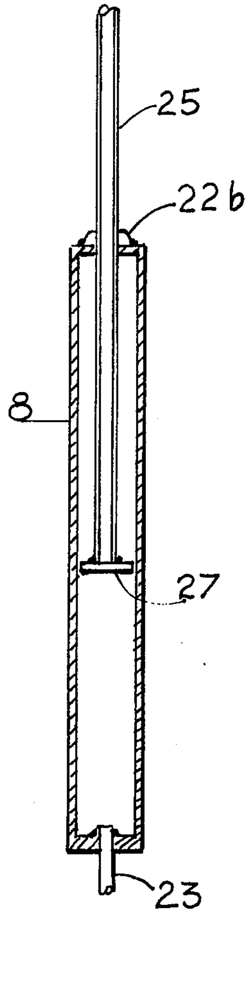
FIG. 6 is a cross-sectional view of the inner leg of the subject invention.
Figure 7:
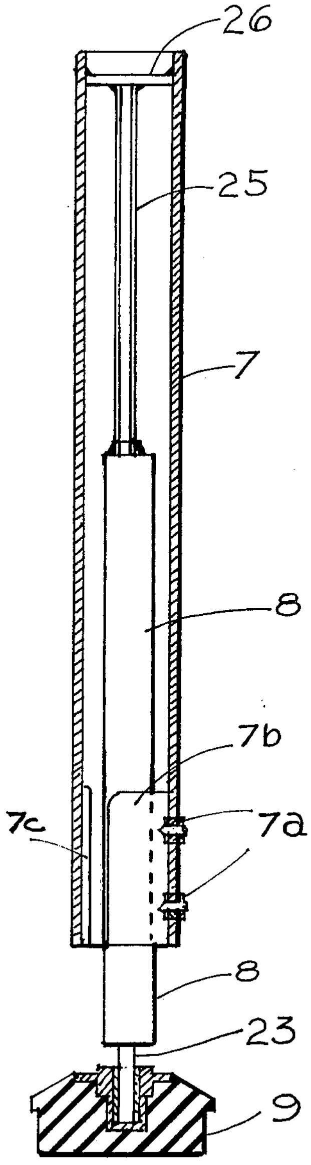
FIG. 7 is a cross-sectional view of the leg assembly of the subject invention.

Referring now to the plurality of FIGS. 5 through 7, the adjustable leg assembly is detailed where the cylindrical inner leg 8 adjustably slides interiorly to square tubular outer leg 7 in a manner controlled by threaded section 25, one end of which is attached by welding centrally to flat plate 26 which in turn, has its ends attached by welding interiorly to outer let 17. Threaded section 25 threads through threaded nut 22*b* which has been welded to the top end portion of inner leg 8. Attached to the opposite end of threaded section 25 as flat plate 26 is circular disk 27 which serves to keep threaded section 25 generally central to the interior of inner leg 8. At the opposite end of inner leg 8 is welded post 23. Post 23 engages a centrally located hole in rubber flat feet 9.

Flat feet 9 comprise a hardened rubber molded foot, circular in shape, with the post receiving socket molded into the foot. Thus, the length of any leg may be adjusted by grasping the lower section of inner leg 8 and turning it until post 23 has fully engaged flat foot 9 and the leg begins to accept a portion of the work station's weight.

When adjustment of the leg length is accomplished, tightening of the inner leg 8 to prevent rotation is accomplished by means of hex set locking screws 7*a*. As can be seen in the cross-sectional view of FIG. 7 interiorly to outer leg 7 have been welded two short pieces of angle iron 7*b* and 7*c*, such as to restrict the lower opening of leg 7 to a size slightly larger than the outside diameter of inner leg 8. Then at one of the corners of leg 7 has been welded two threaded nuts 7*a* and its hex set locking screw therein. Holes have been drilled through leg 7 and angle iron piece 7*b*, then tapped to receive the same screw threads as the nuts welded to the outside of the leg so that a completely threaded passageway is provided. The screws in the hex set locking mechanism then are screwed against inner leg 8 to hold it stationary and prevent rotation which would tend to lengthen or shorten the leg.

Figure 8:
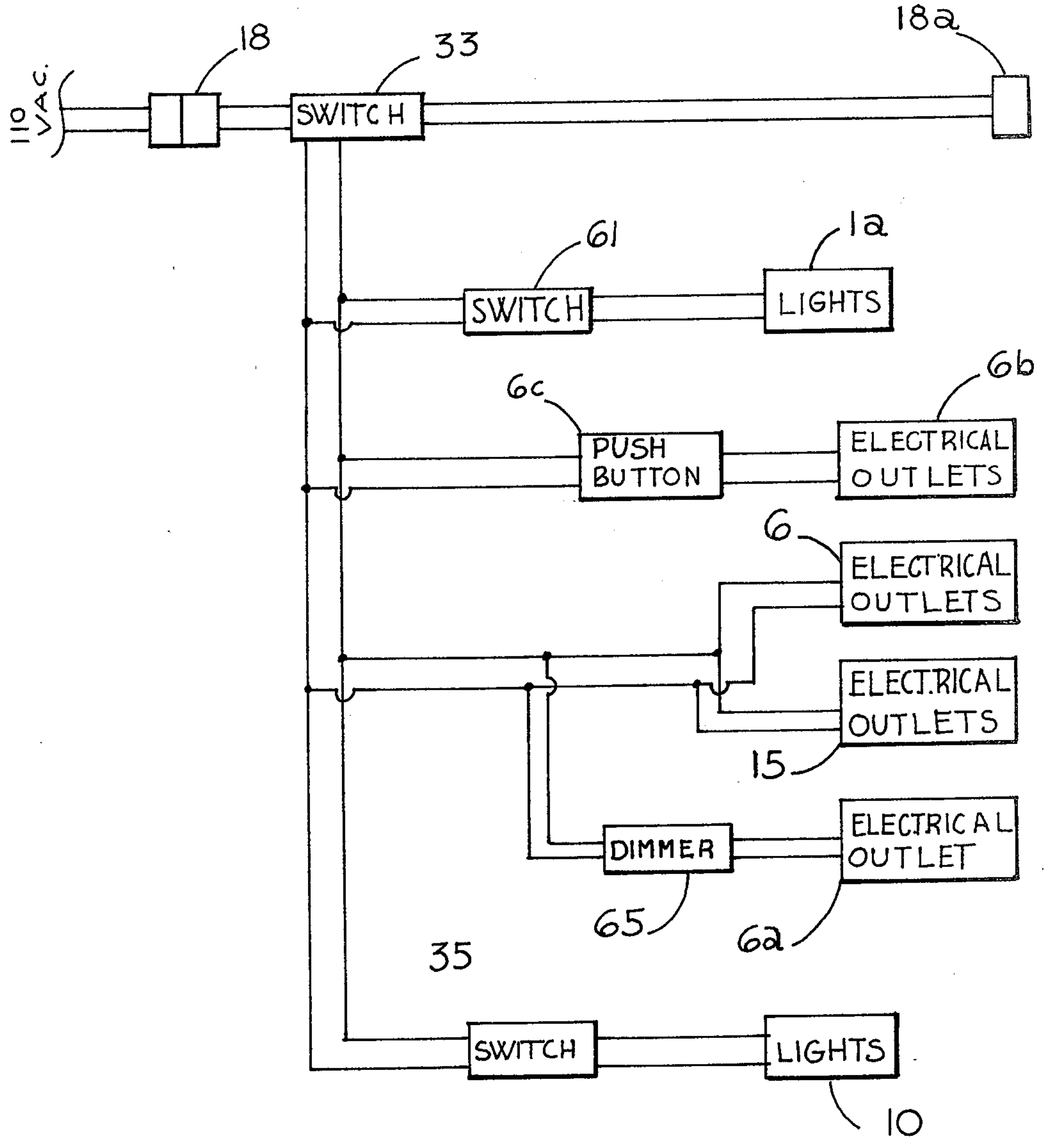
FIG. 8 is a schematic block diagram of the electrical schematic of the subject invention.

Referring now to FIG. 8, an electrical schematic block diagram is shown of the electrical connections within the inventive work station. On the left, 110 volt ac enters the work bench at electrical receptacle 18 where it is directed to switch 33. Similarly, 110 volt ac may also enter switch 33 from the right by means of electrical receptable 18*a*. Switch 33 outputs the electrical power of either input to the electrical outlets and the auxiliary circuits as follows. Connecting to switch 33 output is electrical switch 61 (located on the left hand side of the bench under the top) which controls power to the electrical overhead lights 1*a*. Similarly, push button switch 6*c* also connects to the output of switch 33 which pulses power through electrical outlet 6*b* which is in the immediate front of the bench. Continuing, the output of switch 33 is also conducted to the front and rear electrical outlets 6 and 15 as well as the dimmer control 65 which, as earlier discussed, controls and supplies the voltage at electrical outlet 6*a*. Additionally, and finally, switch 33 is directed to light switch 35 which turns on and off the under top light 10 which lights the area underneath the bench and the top of the shelf 11.

As has been discussed, both the electrical receptacles 18 and 18*a* are male type receptacles recessed in an enclosure and covered with a metal screw type cap.

While a preferred embodiment of the invention has been shown and described, it is to be understood that certain modifications in the construction and arrangement of the invention may be made, as being necessary, without departing from the scope of the appended claims and as a consequence, the invention is not to be limited except as described in the appended claims.

I claim:

1. A technician's work station for repairing equipment and instruments comprising a work top, said work top having operably attached thereto a turning table and tool receiving pin means; a backboard attached to said work top, said backboard having attached a mirror, small tool holding magnetic strips, and a clock; end side boards attached to the work top and backboard; and lighting means operably attached to said backboard whereby a lighted work station, enclosed on three sides, holding small tools in easy accessible range, is provided enabling a technician repairing an instrument to view the back of the instrument simultaneously with the front to time operations of equipment and instrument, and wherein, a piece of equipment or instrument under repair or test may be placed on said turning table for a rotational ease of accessibility and tools to be used by the technicians are readily accessible and retrievable from the tool receiving pin means.

2. The work station as defined in claim 1 further including means to receive and distribute electrical power to a plurality of electrical outlets, said plurality of electrical outlets also including an outlet of variably reducible voltage and an on-off push button controlled outlet, said means to receive and distribute electrical power additionally including first switch means to selectively choose the source of the received power and second switch means for controllably supplying electrical power to the lighting means and clock.

3. The work station as defined in claim 1 further including a plurality of height adjustable legs operably attached to said work top, a plurality of drawers operably attached under said work top, light means and shelf storage means located below said work top whereby said height adjustable legs may adjust the height of said work station for improved technician's work efficiency, and said drawers and shelf provides storage facilities for lesser used tools and equipment.

4. The work station as defined in claim 3 wherein said backboard comprises pegboard material immediately adjacent said table top, and solid material backing operably attached to said pegboard material at a spaced distance therefrom, said pegboard material having a plurality of apertures therethrough adapted to receive associated wire hooks to hold tools; and said lighting means defines front to back adjustable overhead lights.

5. The work station as defined in claim 4 wherein said work top comprises a sound absorbent, light absorbent carpet covered work surface and said turning table includes means to brake and hold said turning top in fixed position.

6. The work station as defined in claim 5 wherein said adjustable lens comprise at least two elongated concentric cylinders; the outer cylinder defining a cross-sectional square cylinder having a centrally located threaded rod attached therein and the inner cylinder defining a circular cross-sectional cylinder with closed ends, one of said closed ends threadably adapted to receive said threaded rod of said outer cylinder; locking screws threadably penetrating the cylindrical surface of said outside cylinder to engage and hold said inner cylinder; a protruding post attached to said inner cylinder other end; and feet, said feet attached to said protruding post, whereby the inner cylinder may be screw adjusted along said threaded rod to adjust the height of said work station and when so finally adjusted, the lock screws may be set.

* * * * *